United States Patent
He

(10) Patent No.: US 8,892,099 B2
(45) Date of Patent: Nov. 18, 2014

(54) METHOD FOR OBTAINING UPLINK SIGNAL QUALITY OF AN ADJACENT CELL AND METHOD FOR OPTIMIZING HANDOFF

(75) Inventor: Feng He, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 559 days.

(21) Appl. No.: 13/259,768

(22) PCT Filed: Apr. 22, 2010

(86) PCT No.: PCT/CN2010/072045
§ 371 (c)(1),
(2), (4) Date: Oct. 20, 2011

(87) PCT Pub. No.: WO2010/121555
PCT Pub. Date: Oct. 28, 2010

(65) Prior Publication Data
US 2012/0028676 A1    Feb. 2, 2012

(30) Foreign Application Priority Data

Apr. 23, 2009  (CN) .......................... 2009 1 0137604

(51) Int. Cl.
*H04W 36/00* (2009.01)
(52) U.S. Cl.
CPC ...... *H04W 36/0094* (2013.01); *H04W 36/0083* (2013.01); *H04W 36/0016* (2013.01)
USPC ............................. 455/436; 455/439; 455/442
(58) Field of Classification Search
CPC .................... H04W 36/0094; H04W 36/0083; H04W 36/0016
USPC ........ 455/426.1, 435.1, 435.2, 434–444, 525, 455/552.1, 553.1, 135, 161.3, 277.2; 370/331–334
See application file for complete search history.

(56) References Cited

U.S. PATENT DOCUMENTS 5,903,840 A * 5/1999 Bertacchi ...................... 455/436
8,285,321 B2 * 10/2012 Ji et al. .......................... 455/525
(Continued)

FOREIGN PATENT DOCUMENTS

CN     1694571 A     11/2005
CN     1886908 A     12/2006
(Continued)

OTHER PUBLICATIONS

International Search Report for PCT/CN2010/072045 dated Jul. 8, 2010.

*Primary Examiner* — Dominic E Rego
(74) *Attorney, Agent, or Firm* — Ling Wu; Stephen Yang; Ling and Yang Intellectual Property

(57) ABSTRACT

A method for obtaining an uplink signal quality of a neighbor cell includes: a serving Evolved Node B obtaining a downlink transmission path loss of current user equipment in said neighbor cell according to a reference signal power of said neighbor cell and a measurement report result of said user equipment for said neighbor cell, taking said downlink transmission path loss as an uplink transmission path loss of said user equipment in said neighbor cell, and estimating the uplink signal quality of said user equipment in said neighbor cell according to said uplink transmission path loss. Correspondingly, the present invention further provides a method for optimizing handover and an evolved node B.

15 Claims, 2 Drawing Sheets

(56) References Cited

U.S. PATENT DOCUMENTS

| | | | |
|---|---|---|---|
| 8,369,883 B2* | 2/2013 | Kuroda et al. | 455/522 |
| 8,483,706 B2* | 7/2013 | Edge et al. | 455/456.1 |
| 2004/0203991 A1* | 10/2004 | Chen et al. | 455/522 |
| 2007/0082620 A1* | 4/2007 | Zhang et al. | 455/69 |
| 2007/0173279 A1* | 7/2007 | Kuroda et al. | 455/522 |
| 2008/0008113 A1* | 1/2008 | Cho et al. | 370/318 |
| 2008/0220806 A1* | 9/2008 | Shin et al. | 455/522 |
| 2008/0232326 A1* | 9/2008 | Lindoff et al. | 370/332 |
| 2009/0028112 A1* | 1/2009 | Attar et al. | 370/332 |
| 2010/0234061 A1* | 9/2010 | Khandekar et al. | 455/522 |
| 2010/0273502 A1* | 10/2010 | Uemura et al. | 455/452.2 |

FOREIGN PATENT DOCUMENTS

| | | |
|---|---|---|
| EP | 1912345 A1 | 4/2008 |
| WO | 2008116027 A2 | 9/2008 |

* cited by examiner

METHOD FOR OBTAINING UPLINK SIGNAL QUALITY OF AN ADJACENT CELL AND METHOD FOR OPTIMIZING HANDOFF

TECHNICAL FIELD

The present invention relates to the wireless cellular communication system, and particularly, to a method for obtaining an uplink signal quality of a neighbor cell in a Long Term Evolution (LTE) mobile communication system and a method for optimizing handover.

BACKGROUND OF THE RELATED ART

The LTE network is composed of Evolved Universal Terrestrial Radio Access Network (E-UTRAN) base stations, namely Evolved Node B (eNB), and an Evolved Packet Core (EPC) of the evolved packet switching center. The coverage range of the LTE system is composed of cellular cells dominated by a plurality of eNBs.

When one user moves in the cellular cell system, the user will unavoidably move from one cell to another cell, which causes the cell re-selection or cell handover. One simple example is that, when one user is calling and moves from the coverage range of a certain cell to the coverage range of another cell, the user is required to automatically carry out handover between cells for the purpose of not interrupting the call. This process is carried out without acknowledge by the user, and with no need of the user involving. As for to which cell the user hands over, and when to carry out the handover, they are all selected by the network side. The handover can include the intra-cell handover, inter-cell handover in the eNB, inter-eNB handover, and the handover between different access systems and so on according to the belongings of the both previous and posterior cells related to the handover. Without loss of generality, the handover procedure can refer to the procedure of the inter-eNB handover, with reference to FIG. 1, comprises:

step 101, the User Equipment (UE) provides the downlink measurement result report to the serving eNB1;

step 102, the eNB1 makes the handover selection, and completes the handover preparation procedure along with eNB2 at the target side of the handover;

step 103, the eNB1 notifies the UE to carry out the handover through the signaling;

step 104, the UE carries out the handover to the eNB2 according to the signaling.

Wherein the procedure of handover selection at the network side in step 102 is required to synthetically consider many factors, wherein the most important factor is the measurement report of the UE in step 101, and when the serving signal quality of local cell is lower than a certain threshold and after the signal quality of a certain neighbor cell reported by the UE is higher than a certain threshold, the network side can notify the UE to carry out the handover. However the network side also should obtain some other assistance information as the reference against some abnormal cases occurring, for example, the network side should include the history information of the UE, such as the time that the UE stays in the last cell in the process of the calling or the traffic, during the handover, to avoid the occurrence of the Ping-Pong handover.

However, in the current handover, a plurality of abnormal cases are unavoidable, for example, the Radio Link Failure (RLF) occurs in the target cell soon after the UE carries out the handover, thereby affecting the system performance, and also affecting the user's experience. Wherein, one of the reasons is that the uplink transmission by the UE in the target cell is not ideal. The main factor considered in the current handover selection is obtained according to the measurement of the downlink serving signal of the neighbor cell by the UE.

Besides, in the LTE system, in order to reduce the amount of the manual maintenance work of the network and to optimize the network capability, the LTE is required to support the Self-Organized Network (SON) function in the demands proposed by the Next Generation Mobile Networks (NGMN) organization at present, and the SON function includes the Coverage and Capacity Optimization (CCO) function of the network, namely the parameter configuration of the cell can be automatically modified through the automatic configuration function and the self-optimization function of the network, thereby achieving the optimization of the network coverage.

SUMMARY OF THE INVENTION

In order to implement the CCO function in the LTE system, the network side is required to obtain the input parameter of the current network coverage performance. As shown in FIG. 2, the cell A and cell B dominated by the eNB1 and eNB2 are neighbor cells, however the uplink and downlink coverage of the cell A has a problem, and the uplink coverage is smaller than the downlink coverage, and at this time, when the UE which is located in the cell A moves to the area D shown in the figure, the measurement of the UE can not be reported due to lacking the uplink, and finally UE drops the call and so on, and thus how to detect the area with this problem is also a problem to be solved.

The technical problem to be solved in the present invention is to provide a method for obtaining an uplink signal quality of a neighbor cell and a method for optimizing handover, and a corresponding Evolved Node B so as to improve the user's experience.

In order to solve the above problem, the present invention provides a method for obtaining an uplink signal quality of a neighbor cell, which comprises:

a serving Evolved Node B obtaining a downlink transmission path loss of current user equipment in said neighbor cell according to a reference signal power of said neighbor cell and a result of the measurement for said neighbor cell reported by the UE, taking said downlink transmission path loss as an uplink transmission path loss of said user equipment in said neighbor cell, and estimating the uplink signal quality of said user equipment in said neighbor cell according to said uplink transmission path loss.

Before the step of obtaining said downlink transmission path loss, said method further comprises:

the reference signal power of said neighbor cell being reported to the serving Evolved Node B by said user equipment, or the reference signal power of said neighbor cell being notified to the serving Evolved Node B through an X2 interface setup procedure or an evolved node B configuration update procedure by the Evolved Node B of the neighbor cell, wherein serving cell information in an X2 interface setup or response message includes the reference signal power of said neighbor cell, or the serving cell information in an evolved node B configuration update message includes the reference signal power of said neighbor cell.

After the step of taking said downlink transmission path loss as the uplink transmission path loss of said user equipment in said neighbor cell, said method further comprises:

if the uplink transmission path loss of said user equipment in said neighbor cell is greater than a configured second threshold, then the serving Evolved Node B considering that uplink coverage and downlink coverage of said neighbor cell are not matched, and said serving Evolved Node B notifying that the coverage of the Evolved Node B of said neighbor cell is abnormal.

The method further comprises:

said second threshold being configured by an Operation Administration and Maintenance (OAM) system; or said second threshold being notified by the Evolved Node B of said neighbor cell to said serving Evolved Node B.

The Evolved Node B of said neighbor cell notifying said second threshold to said serving Evolved Node B by a following way:

the Evolved Node B of said neighbor cell notifying said serving Evolved Node B through an X2 interface setup procedure or an evolved node B configuration update procedure, and serving cell information in an X2 interface setup or response message including said second threshold, or the serving cell information in an evolved node B configuration update message including said second threshold.

The method further comprises:

said serving Evolved Node B notifying an Operation Administration and Maintenance (OAM) system that the coverage of the Evolved Node B of said neighbor cell is abnormal.

The present invention further provides method for optimizing handover, which comprises:

a serving Evolved Node B of user equipment estimating an uplink signal quality of said user equipment in a neighbor cell according to the above method for obtaining the uplink signal quality of the neighbor cell, and when the uplink signal quality of said user equipment in the neighbor cell does not satisfy a configured condition, the serving Evolved Node B taking said neighbor cell as a candidate neighbor cell of the handover, and continuing to select other cells which satisfy the condition.

Said configured condition is: the uplink transmission path loss of said user equipment in said neighbor cell is greater than a configured first, threshold.

The method for optimizing handover further comprises:

said first threshold being configured by an Operation Administration and Maintenance (OAM) system; or said first threshold being notified by an Evolved Node B of said neighbor cell to said serving Evolved Node B.

The Evolved Node B of said neighbor cell notifying said first threshold to said serving Evolved Node B by a following way:

the Evolved Node B of said neighbor cell notifying to said serving Evolved Node B through an X2 interface setup procedure or an evolved node B configuration update procedure, and serving cell information in an X2 interface setup or response message including said first threshold, or the serving cell information in an evolved node B configuration update message including said first threshold.

The present invention further provides an Evolved Node B, which comprises: a downlink transmission path loss obtaining module and an uplink signal quality obtaining module, wherein said downlink transmission path loss obtaining module is configured to: obtain a downlink transmission path loss of current user equipment in a neighbor cell according to a reference signal power of said neighbor cell and a measurement report result of said user equipment for said neighbor cell; and the uplink signal quality obtaining module is configured to: take the downlink transmission path loss obtained by said downlink transmission path loss obtaining module as an uplink transmission path loss of said user equipment in said neighbor cell, and estimate an uplink signal quality of said user equipment in said neighbor cell according to said uplink transmission path loss.

Said downlink transmission path loss obtaining module is further configured to: receive the reference signal power of said neighbor cell reported by the user equipment, or obtain the reference signal power of said neighbor cell from serving cell information in an X2 interface setup or response message sent by an Evolved Node B ofe said neighbor cell through an X2 interface setup procedure, or obtain the reference signal power of said neighbor cell from serving cell information in configuration update message sent through an evolved node B configuration update procedure.

The Evolved Node B further comprises an abnormal detection notification module, wherein said abnormal detection notification module is configured to: receive said second threshold configured by an Operation Administration and Maintenance (OAM) system; or receive said second threshold sent by the Evolved Node B of said neighbor cell; and judge whether the uplink transmission path loss of said user equipment in said neighbor cell is greater than a configured second threshold, and if so, then uplink coverage and downlink coverage of said neighbor cell being not matched, and notify the Evolved Node B of said neighbor cell and/or an Operation Administration and Maintenance (OAM) system that the coverage of the Evolved Node B of said neighbor cell is abnormal.

The Evolved Node B further comprises a handover module, wherein said handover module is configured to: take said neighbor cell as a candidate neighbor cell of the handover when the uplink signal quality of said user equipment in the neighbor cell does not satisfy a configured condition, and continue to select other cells satisfying the condition; wherein said configured condition is: the uplink transmission path loss of said user equipment in said neighbor cell is greater than a configured first threshold.

Said handover module is further configured to: receive said first threshold configured by an Operation Administration and Maintenance (OAM) system; or receive said first threshold sent by the Evolved Node B of said neighbor cell.

Applying the present invention enables the source Evolved Node B to estimate the uplink transmission quality of the UE in the neighbor cell, and optimizes the handover target selection according to the uplink transmission quality of the UE in the neighbor cell, thereby reducing the handover failure rate of the UE; and meanwhile the coverage problem of the neighbor cell can be detected in time, and is fed back to the neighbor cell so that the neighbor cell carries out the optimization adjustment of the coverage.

PREFERRED EMBODIMENTS OF THE PRESENT INVENTION

The present invention proposes a following method for estimating an uplink signal quality of a neighbor cell: obtaining a downlink transmission path loss of the user equipment in the neighbor cell according to the measurement report result of this user equipment for the neighbor cell and the reference signal power of this neighbor cell, taking the downlink transmission path loss as the uplink transmission path loss of the user equipment in this neighbor cell, and estimating the uplink signal quality of the user equipment in this neighbor cell according to the uplink transmission path loss.

The handover optimization and coverage optimization can be carried out according to said method for estimating the uplink signal quality of the neighbor cell. When the network side makes the UE handover selection, the uplink signal quality of the UE in the neighbor cell is considered, specifically, the uplink transmission path loss of the UE in the neighbor cell is estimated according to the signal quality of the neighbor cell measured and reported by the UE and the reference signal power of the neighbor cell, and the uplink signal quality of the UE in the target cell is estimated according to the value of the uplink transmission path loss, thereby optimizing the handover selection of this cell.

The network side can further detect the uplink and downlink coverage problem according to the path loss of the neighbor cell, thereby notifying the neighbor cell that the coverage is abnormal so as to act as the input parameter of carrying out the coverage optimization of the neighbor cell. Particularly, it can be judged whether the uplink coverage and downlink coverage are matched according to the uplink transmission path loss, and when the coverage is not matched, the Evolved Node B of the neighbor cell is notified of this.

In order to make the objects, technical scheme and advantages clearer, below it will further describe the present invention in detail, wherein cell A and cell B are two neighbor cells from each other belonging to two different Evolved Node Bs, eNB1 and eNB2.

Embodiment One

Figure 1:
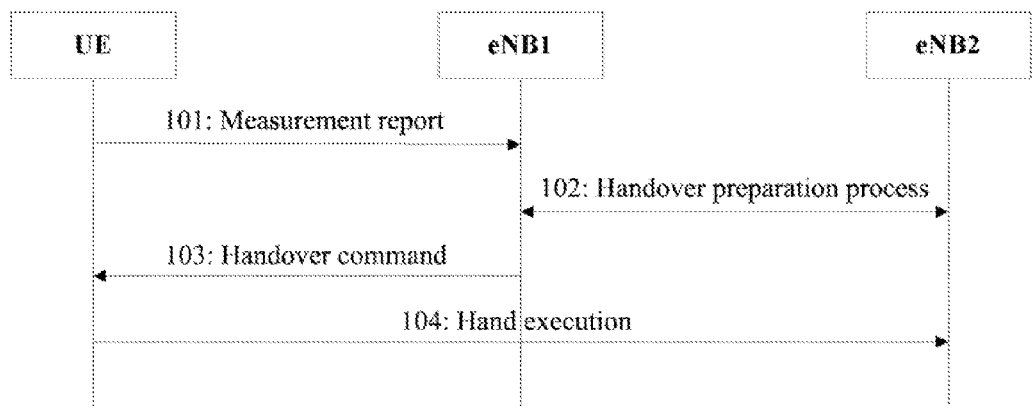
FIG. 1 is a schematic diagram of the handover procedure between eNBs.
Figure 2:
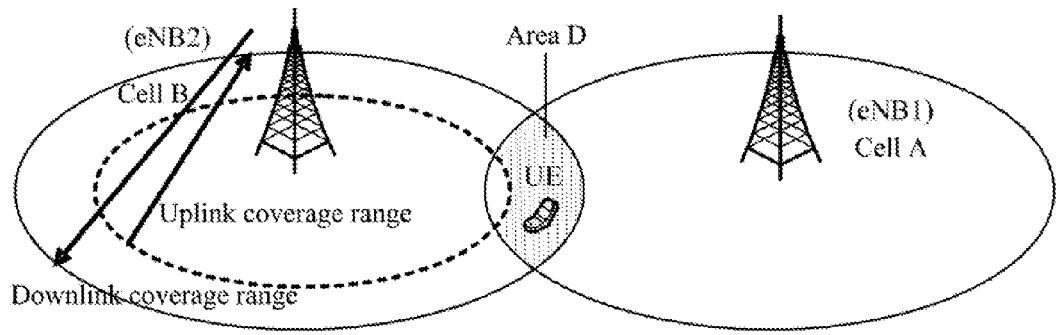
FIG. 2 is a schematic diagram of the abnormal uplink and downlink coverage of the cell.
Figure 3:
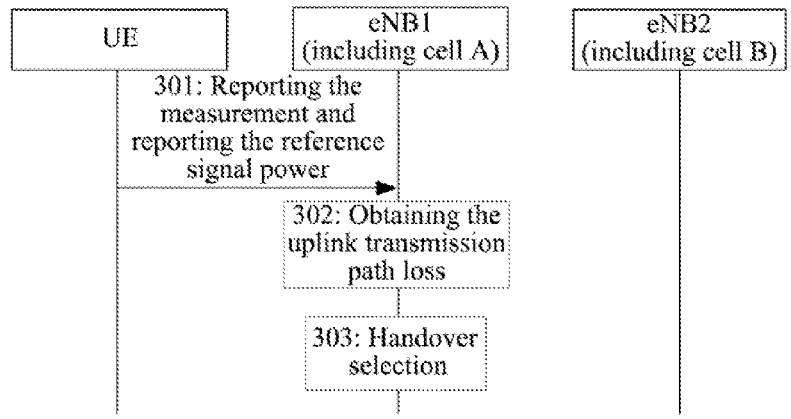
FIG. 3 is a flow chart of the embodiment one of the present invention.
Figure 5:
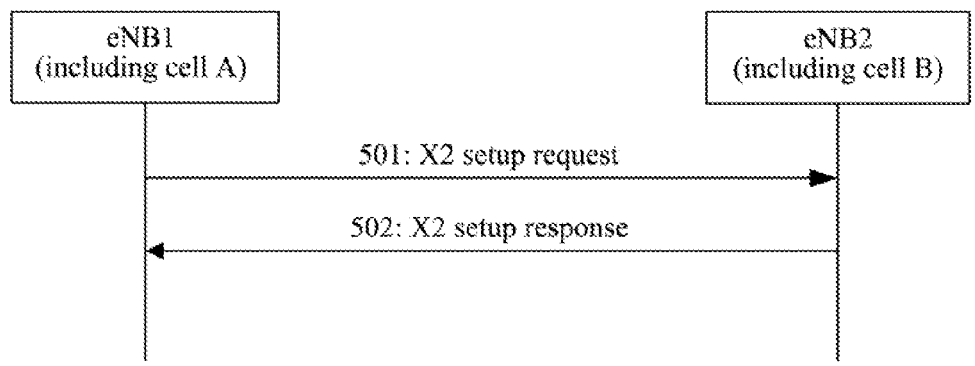
FIG. 5 is a flow chart of setting up the X2 interface.
Figure 6:
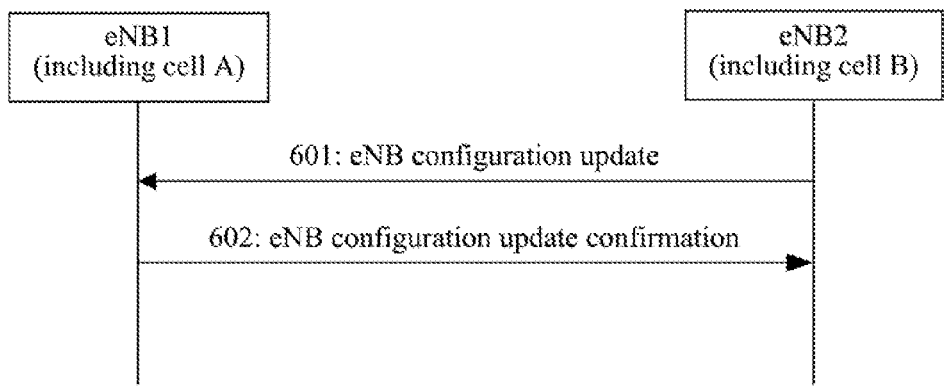
FIG. 6 is a flow chart of updating the eNB configuration.

As shown in FIG. 3, eNB1 makes the handover optimization selection according to the measurement report result and the uplink signal quality of the UE in the neighbor cell, which particularly comprises:

step 301, the UE located in the cell A reports the measurement result to the eNB1, the measurement result includes the measurement result of the UE for the signal of the cell B, and also reports the reference signal power "ReferenceSignalPower" information of the cell B to the eNB1 at the same time;

step 302, the eNB1 calculates the downlink transmission path loss $PL_{DL}$ of the UE in the cell B according to the reference signal power "ReferenceSignalPower" of the cell B and the measurement result of the UE for the signal of the cell B, and since the difference between the uplink path loss and the downlink path loss is very small in the wireless transmission process, thus the calculated downlink transmission path loss $PL_{DL}$ is approximately taken as the uplink transmission path loss $PL_{UL}$ of the UE in the cell B, namely:

$$PL_{UL} \approx PL_{DL} = \text{referenceSignalPower} - M_N$$

wherein the $M_N$ is the measurement result of the UE for the signal of the cell B.

step 303, if the measurement report result of the UE satisfies the handover condition, the eNB1 further makes the handover selection according the uplink transmission path loss $PL_{UL}$ of the cell B calculated in the above step. If the uplink signal quality of the UE in the cell B does not satisfy the configured condition, namely the value of the $PL_{UL}$ is greater than the configured first threshold $Thresh_{HO}$, it is denoted that the uplink transmission power of the UE in the cell B is not enough, or the uplink serving quality of cell B for the UE does not satisfy the service requirement of the current UE. At this time, the eNB1 takes the cell B as the candidate neighbor cell of the target side of the handover, and continues to select other neighbor cell satisfying the condition;

furthermore, the first threshold $Thresh_{HO}$ used in step 303 can be the default value configured by the Operation Administration and Maintenance (OAM) system, and also can be the specified value notified by the eNB2 to the eNB1, wherein the method of the eNB2 notifying the eNB1 can be carried out through the X2 interface setup procedure (as shown in FIG. 5), or the eNB configuration update procedure (as shown in FIG. 6), and the serving cell information in the related message includes the greatest path loss threshold $Thresh_{HO}$ allowed in this cell, namely, the serving cell information of the X2 interface setup/response message or the eNB configuration update message includes said first threshold.

Embodiment Two

Figure 4:
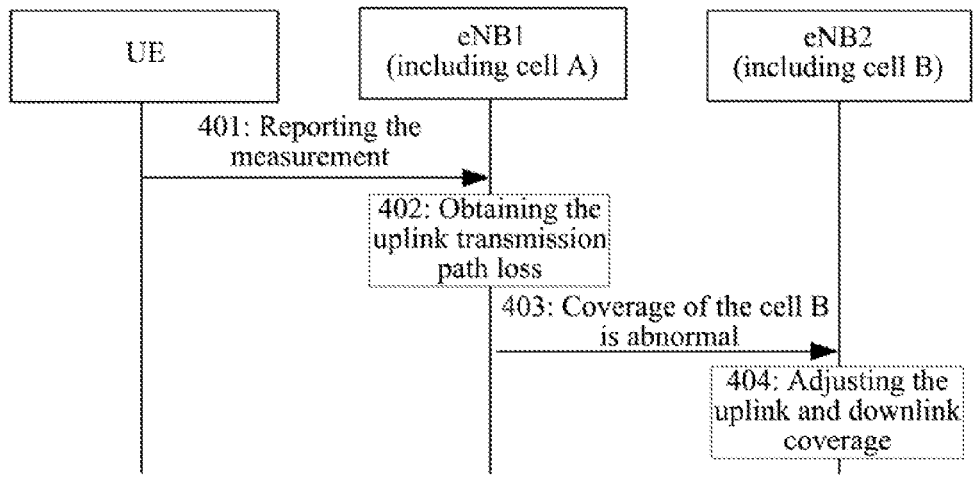
FIG. 4 is a flow chart of the embodiment two of the present invention.

FIG. 4 shows the flow chart of the method for optimizing the coverage proposed in the present invention, and the method comprises:

steps 401-402, the same as the steps 301-302;

step 403, if the uplink transmission path loss $PL_{UL}$ of the UE in the cell B calculated by the eNB1 in step 402 is greater than the configured second threshold $Thresh_{COVERAGE}$, it is denoted that the uplink coverage and downlink coverage of the neighbor cell are not matched, namely the uplink is not enough, or the downlink coverage of the neighbor cell is too large. At this time, the eNB1 notifies the eNB2 that the coverage is abnormal through the X2 interface message.

Step 404, the eNB2 takes this message into its own statistical data after receiving the message, and makes the input of subsequently adjusting the self uplink and downlink coverage according to the statistical data.

Furthermore, in step 403, the eNB1 also can notify the OAM that the coverage of the eNB2 is abnormal, and the OAM uniformly makes the decision of whether the coverage parameters are required to be adjusted.

Furthermore, the second threshold $Thresh_{COVERAGE}$ used in step 403 can be the default value configured by the OAM, and also can be the specified value notified to the eNB1 by the eNB2, wherein the method of the eNB2 notifying the eNB1 can be carried out through the setup procedure of the X2 interface (as shown in FIG. 5), or the eNB configuration update procedure (as shown in FIG. 6), and the serving cell information in the related message includes the greatest path loss threshold $Thresh_{COVERAGE}$ allowed in this cell, namely, the serving cell information in X2 interface setup/response message or the eNB configuration update message includes said second threshold.

Furthermore, the reference signal power "ReferenceSignalPower" information of the cell B dominated by the eNB2 in the step 301 or step 401 in embodiment one and embodiment two also can be notified by the eNB2 to the eNB1, wherein the method of the eNB2 notifying the eNB1 can be carried out through the setup procedure of the X2 interface (as shown in FIG. 5), or the eNB configuration update procedure (as shown in FIG. 6), and the serving cell information in the related message includes the reference signal power of this cell, namely, the serving cell information in the X2 interface setup/response message or the eNB configuration update message includes said reference signal power.

Below it will describe the FIG. 5 and FIG. 6.

FIG. 5 is a setup procedure of the X2 interface, one of or a combination of the first threshold, the second threshold and reference signal power can be transferred through this procedure, and one of or a combination of the first threshold, the second threshold and reference signal power can be included in the X2 interface setup/response message, and comprises:

step 501, the eNB1 initiates the X2 setup request message to the eNB2, the serving cell information of the cell A in the setup request message includes one or more of the reference signal power "ReferenceSignalPower" information of the cell A, the greatest path loss threshold $Thresh_{HO}$ allowed in this cell, and the greatest path loss threshold $Thresh_{COVERAGE}$ allowed in this cell.

Step 502, if the eNB2 processes successfully after receiving the X2 setup request message, the eNB2 returns the X2 setup response message to the eNB1, the serving cell information of the cell B in the setup response message includes one or more of the reference signal power "ReferenceSignalPower" information of the cell B, the greatest path loss threshold $Thresh_{HO}$ allowed in this cell, and the greatest path loss threshold $Thresh_{COVERAGE}$ allowed in this cell.

FIG. 6 is an eNB configuration update procedure, one of or a combination of the first threshold, the second threshold and the reference signal power can be transferred through this process, and the process comprises:

step 601, the eNB2 initiates the eNB configuration update message to the eNB1, the serving cell information in the configuration update message includes one or more of the reference signal power "ReferenceSignalPower" information of the cell B, the greatest path loss threshold $Thresh_{HO}$ allowed in this cell, and the greatest path loss threshold $Thresh_{COVERAGE}$ allowed in this cell.

Step 602, the eNB1 returns the eNB configuration update confirmation message to the eNB2 after receiving the eNB configuration update message.

Accordingly, the present invention further provides an Evolved Node B, which includes a downlink transmission path loss obtaining module and an uplink signal quality obtaining module, wherein the downlink transmission path loss obtaining module is configured to: obtain a downlink transmission path loss of the current user equipment in the neighbor cell according to the reference signal power of this neighbor cell and a measurement report result of this user equipment for the neighbor cell; and the uplink signal quality obtaining module is configured to: take the downlink transmission path loss obtained by the downlink transmission path loss obtaining module as the uplink transmission path loss of the user equipment in this neighbor cell, and estimate the uplink signal quality of the user equipment in the neighbor cell according to this uplink transmission path loss.

The downlink transmission path loss obtaining module is further configured to: receive the reference signal power of the neighbor cell reported by the user equipment, or obtain the reference signal power of the neighbor cell from the serving cell information in the X2 interface setup or response message sent by the Evolved Node B of the neighbor cell through the X2 interface setup procedure, or obtain the reference signal power of the neighbor cell from the serving cell information of the configuration update message sent in the eNB configuration update procedure.

The Evolved Node B further comprises an abnormal detection notification module, wherein the abnormal detection notification module is configured to: receive the second threshold configured by the Operation Administration and Maintenance (OAM) system, or receive the second threshold sent by the Evolved Node B of the neighbor cell; and judge whether the uplink transmission path loss of the user equipment in this neighbor cell is greater than the configured second threshold, and if so, then the uplink coverage and downlink coverage of this neighbor cell are not matched, and notify the Evolved Node B of the neighbor cell and/or the OAM system that the coverage of the Evolved Node B of said neighbor cell is abnormal.

The Evolved Node B further comprises a handover module, wherein the handover module is configured to: take this neighbor cell as the candidate neighbor cell of the handover when the uplink signal quality of the user equipment in the neighbor cell does not satisfy the configured condition, and continue to select other cells satisfying the condition; wherein the configured condition is: the uplink transmission path loss of said user equipment in said neighbor cell is greater than the configured first threshold.

The handover module is further configured to: receive the first threshold configured by the Operation Administration and Maintenance (OAM) system; or receive the first threshold sent by the Evolved Node B of said neighbor cell.

Finally it should be described that the above embodiments are only for describing the present invention, but not for limiting the present invention. Modifications or substitutions made to the present invention without departing from the spirit or scope of the present invention shall all fall into the protection scope of the claims of the present invention.

INDUSTRIAL APPLICABILITY

The present invention enables the source Evolved Node B to estimate the uplink transmission quality of the UE in the neighbor cell, and optimizes the handover target selection according to the uplink transmission quality of the UE in the neighbor cell, thereby reducing the handover failure rate of the UE; and meanwhile the coverage problem of the neighbor cell can be detected in time, and is fed back to the neighbor cell so that the neighbor cell carries out the optimization adjustment of the coverage.

What is claimed is:

1. A method for obtaining an uplink signal quality of a neighbor cell, comprising:
    a serving Evolved Node B (eNB) obtaining a downlink transmission path loss of a current user equipment (UE) in said neighbor cell according to a reference signal power of said neighbor cell and a measurement report result of said UE for said neighbor cell, taking said downlink transmission path loss as an uplink transmission path loss of said UE in said neighbor cell, and estimating the uplink signal quality of said UE in said neighbor cell according to said uplink transmission path loss.

2. The method as claimed in claim 1, wherein before the step of obtaining said downlink transmission path loss, said method further comprises:
    the reference signal power of said neighbor cell being reported to the serving eNB by said UE, or
    the reference signal power of said neighbor cell being notified to the serving eNB by an eNB of said neighbor cell through an X2 interface setup procedure or an eNB configuration update procedure, wherein serving cell information in an X2 interface setup or response message includes the reference signal power of said neighbor cell, or the serving cell information in an eNB configuration update message includes the reference signal power of said neighbor cell.

3. The method as claimed in claim 1, wherein after the step of taking said downlink transmission path loss as the uplink transmission path loss of said UE in said neighbor cell, said method further comprises:
if the uplink transmission path loss of said UE in said neighbor cell is greater than a configured threshold, then the serving eNB considering that uplink coverage and downlink coverage of said neighbor cell are not matched, and said serving eNB notifying that the coverage of an eNB of said neighbor cell is abnormal.

4. The method as claimed in claim 3, further comprising:
said threshold being configured by an Operation Administration and Maintenance (OAM) system; or
said threshold being notified by the eNB of said neighbor cell to said serving eNB.

5. The method as claimed in claim 4, wherein:
the eNB of said neighbor cell notifies said threshold to said serving eNB by a following way:
the eNB of said neighbor cell notifying to said serving eNB through an X2 interface setup procedure or an eNB configuration update procedure, and serving cell information in an X2 interface setup or response message including said threshold, or the serving cell information in an eNB configuration update message including said threshold.

6. The method as claimed in claim 3, further comprising:
said serving eNB notifying an Operation Administration and Maintenance (OAM) system that the coverage of the eNB of said neighbor cell is abnormal.

7. A method for optimizing handover, comprising:
a serving Evolved Node B (eNB) of a user equipment (UE) estimating an uplink signal quality of said UE in a neighbor cell according to the method for obtaining the uplink signal quality of the neighbor cell as claimed in claim 1, and when the uplink signal quality of said UE in the neighbor cell does not satisfy a configured condition, the serving eNB taking said neighbor cell as a candidate neighbor cell of the handover, and continuing to select other cells which satisfy the condition.

8. The method for optimizing handover as claimed in claim 7, wherein
said configured condition is the uplink transmission path loss of said UE in said neighbor cell is greater than a configured first threshold.

9. The method for optimizing handover as claimed in claim 8, further comprising:
said first threshold being configured by an Operation Administration and Maintenance (OAM) system; or
said first threshold being notified by an eNB of said neighbor cell to said serving eNB.

10. The method for optimizing handover as claimed in claim 9, wherein the eNB of said neighbor cell notifies said first threshold to said serving eNB by a following way:
the eNB of said neighbor cell notifying to said serving eNB through an X2 interface setup procedure or an eNB configuration update procedure, and serving cell information in an X2 interface setup or response message including said first threshold, or the serving cell information in an eNB configuration update message including said first threshold.

11. An Evolved Node B (eNB), comprising a downlink transmission path loss obtaining module and an uplink signal quality obtaining module, wherein
said downlink transmission path loss obtaining module is configured to obtain a downlink transmission path loss of a current user equipment (UE) in a neighbor cell according to a reference signal power of said neighbor cell and a measurement report result of said UE for said neighbor cell; and
the uplink signal quality obtaining module is configured to take the downlink transmission path loss obtained by said downlink transmission path loss obtaining module as an uplink transmission path loss of said UE in said neighbor cell, and estimate an uplink signal quality of said UE in said neighbor cell according to said uplink transmission path loss.

12. The eNB as claimed in claim 11, wherein
said downlink transmission path loss obtaining module is further configured to receive the reference signal power of said neighbor cell reported by the UE, or obtain the reference signal power of said neighbor cell from serving cell information in an X2 interface setup or response message sent by an eNB of said neighbor cell through an X2 interface setup procedure, or obtain the reference signal power of said neighbor cell from serving cell information in an eNB configuration update message sent through an eNB configuration update procedure.

13. The eNB as claimed in claim 11, further comprising an abnormal detection notification module, wherein
said abnormal detection notification module is configured to receive a threshold configured by an Operation Administration and Maintenance (OAM) system or sent by the eNB of said neighbor cell; and
notify the eNB of said neighbor cell and/or an Operation Administration and Maintenance (OAM) system that the coverage of the eNB of said neighbor cell is abnormal when judging that the uplink transmission path loss of said UE in said neighbor cell is greater than the configured threshold, which means uplink coverage and downlink coverage of said neighbor cell are not matched.

14. The eNB as claimed in claim 11, further comprising a handover module, wherein
said handover module is configured to take said neighbor cell as a candidate neighbor cell of the handover when the uplink signal quality of said UE in the neighbor cell does not satisfy a configured condition, and continue to select other cells which satisfy the condition; wherein
said configured condition is the uplink transmission path loss of said UE in said neighbor cell is greater than a configured first threshold.

15. The eNB as claimed in claim 14, wherein
said handover module is further configured to receive said first threshold configured by an Operation Administration and Maintenance (OAM) system; or receive said first threshold sent by the eNB of said neighbor cell.

* * * * *